United States Patent
Palamadai et al.

(10) Patent No.: US 12,159,534 B2
(45) Date of Patent: Dec. 3, 2024

(54) NETWORK ZONE EXCESS CAPACITY UTILIZATION FOR NETWORK-CONNECTED VEHICLES AND MULTI-PARTICIPANT EXTENDED REALITY EXPERIENCES

(71) Applicant: AT&T Intellectual Property I, L.P., Atlanta, GA (US)

(72) Inventors: Rashmi Palamadai, Naperville, IL (US); Eric Zavesky, Austin, TX (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 240 days.

(21) Appl. No.: 17/838,252

(22) Filed: Jun. 12, 2022

(65) Prior Publication Data
US 2023/0401958 A1 Dec. 14, 2023

(51) Int. Cl.
*G08G 1/0968* (2006.01)
*H04W 4/029* (2018.01)
*H04W 4/40* (2018.01)
*H04W 28/02* (2009.01)
*H04W 88/08* (2009.01)

(52) U.S. Cl.
CPC ...... *G08G 1/096833* (2013.01); *H04W 4/029* (2018.02); *H04W 4/40* (2018.02); *H04W 28/0226* (2013.01); *H04W 88/08* (2013.01)

(58) Field of Classification Search
CPC .. G08G 1/096833; H04W 4/029; H04W 4/40; H04W 28/0226; H04W 88/08
See application file for complete search history.

(56) References Cited

U.S. PATENT DOCUMENTS

| | | | |
|---|---|---|---|
| 10,159,036 B1* | 12/2018 | Altintas | H04W 48/17 |
| 11,644,829 B2* | 5/2023 | Shaw | G05D 1/0027 |
| | | | 701/2 |
| 2014/0302774 A1* | 10/2014 | Burke | G07C 5/08 |
| | | | 455/3.05 |
| 2014/0335952 A1* | 11/2014 | Hall | H04L 67/52 |
| | | | 463/31 |

(Continued)

FOREIGN PATENT DOCUMENTS

EP 3913939 A1 * 11/2021 ...... B60W 30/18163

OTHER PUBLICATIONS

Xu, J, et al., "Optimal Pricing and Capacity Planning of a New Economy Cloud Computing Service Class", 2015 International Conference on Cloud and Autonomic Computing, pp. 149-157.

(Continued)

*Primary Examiner* — Chico A Foxx

(57) ABSTRACT

A processing system including at least one processor may identify a network zone with excess capacity, the network zone comprising a plurality of network components of a telecommunication network, transmit an invitation to a set of entities to utilize the network zone to obtain at least one network service at a geographic location of the network zone, configure at least one network component of the plurality of network components in accordance with an anticipated network demand from the set of entities, and provide the at least one network service to at least one entity of the set of entities via the network zone when the at least one entity is present at the geographic location of the network zone.

20 Claims, 4 Drawing Sheets

(56) References Cited

U.S. PATENT DOCUMENTS

| | | | | |
|---|---|---|---|---|
| 2015/0100225 | A1* | 4/2015 | Fuehrer | G08G 1/096725 |
| | | | | 701/118 |
| 2015/0222553 | A1* | 8/2015 | Macdonald | H04W 4/40 |
| | | | | 370/230.1 |
| 2017/0126625 | A1* | 5/2017 | Haak | H04L 63/029 |
| 2017/0302362 | A1* | 10/2017 | High | H04W 24/02 |
| 2018/0278722 | A1* | 9/2018 | Jow | G06F 3/0484 |
| 2018/0308038 | A1* | 10/2018 | Zhou | G06Q 10/063114 |
| 2018/0376357 | A1* | 12/2018 | Tavares Coutinho | |
| | | | | H04W 64/003 |
| 2019/0149517 | A1* | 5/2019 | Haak | H04L 63/029 |
| | | | | 726/11 |
| 2019/0238214 | A1* | 8/2019 | High | H04W 4/02 |
| 2019/0306680 | A1* | 10/2019 | Doggart | H04L 67/52 |
| 2020/0162901 | A1* | 5/2020 | Liu | H04W 4/06 |
| 2020/0322233 | A1 | 10/2020 | Gao et al. | |
| 2020/0357283 | A1* | 11/2020 | Sato | G08G 1/096741 |
| 2020/0394923 | A1* | 12/2020 | Thompson | G08G 1/096816 |
| 2021/0043087 | A1* | 2/2021 | Mezaael | G08G 1/202 |
| 2021/0099828 | A1* | 4/2021 | Hanna | H04W 4/021 |
| 2021/0114616 | A1* | 4/2021 | Altman | G01C 21/3889 |
| 2021/0176801 | A1* | 6/2021 | Yao | H04L 41/0893 |
| 2021/0234835 | A1* | 7/2021 | Chen | H04L 67/1001 |
| 2021/0374782 | A1* | 12/2021 | Huston | H04W 4/21 |
| 2022/0007379 | A1* | 1/2022 | Cao | H04W 72/02 |
| 2022/0052731 | A1* | 2/2022 | Legg | H04B 7/022 |
| 2022/0068140 | A1* | 3/2022 | Brandon | G06Q 50/01 |
| 2022/0163336 | A1* | 5/2022 | Rahematpura | G01C 21/3896 |
| 2022/0385638 | A1* | 12/2022 | Chen | H04L 12/4633 |
| 2022/0408500 | A1* | 12/2022 | Parzysz | G08G 5/0069 |
| 2023/0179975 | A1* | 6/2023 | Pateromichelakis | H04W 4/50 |
| | | | | 709/217 |
| 2023/0254292 | A1* | 8/2023 | Chen | H04L 63/123 |
| | | | | 713/168 |
| 2023/0308921 | A1* | 9/2023 | Kachemir | H04W 48/16 |
| 2023/0412608 | A1* | 12/2023 | Vaishnavi | H04L 63/102 |

OTHER PUBLICATIONS

Vits, T., "The Crucial Role of Networks and Edge Cloud for Truly Immersive XR Experiences", AIXR The Academy of International Extended Reality, Jul. 9, 2021, downloaded from https://aixr.org/insights/the-crucial-role-of-networks-and-edge-cloud-for-truly-immersive-xr-experiences/, 12 pages.

Ethirajulu, B., "How 5G and Edge Computing can enhance virtual reality", Ericsson Blog, Apr. 8, 2020, downloaded from https://www.ericsson.com/en/blog/2020/4/how-5g-and-edge-computing-can-enhance-virtual-reality, 8 pages.

Miller, R., "Spotinst, excess cloud capacity management service, snares $35M Series B", TechCrunch, Aug. 28, 2018, downloaded from https://techcrunch.com/2018/08/28/spotinst-excess-cloud-capacity-management-service-snares-35m-series-b/?renderMode=ie11, 9 pages.

* cited by examiner

NETWORK ZONE EXCESS CAPACITY UTILIZATION FOR NETWORK-CONNECTED VEHICLES AND MULTI-PARTICIPANT EXTENDED REALITY EXPERIENCES

The present disclosure relates generally to network-connected vehicles and multi-participant extended reality experience, and more particularly to methods, computer-readable media, and apparatuses for providing a network service via a network zone of a telecommunication network with excess capacity to at least one entity of a set of entities present at a geographic location of the network zone and to which an invitation to utilize the network zone is transmitted.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
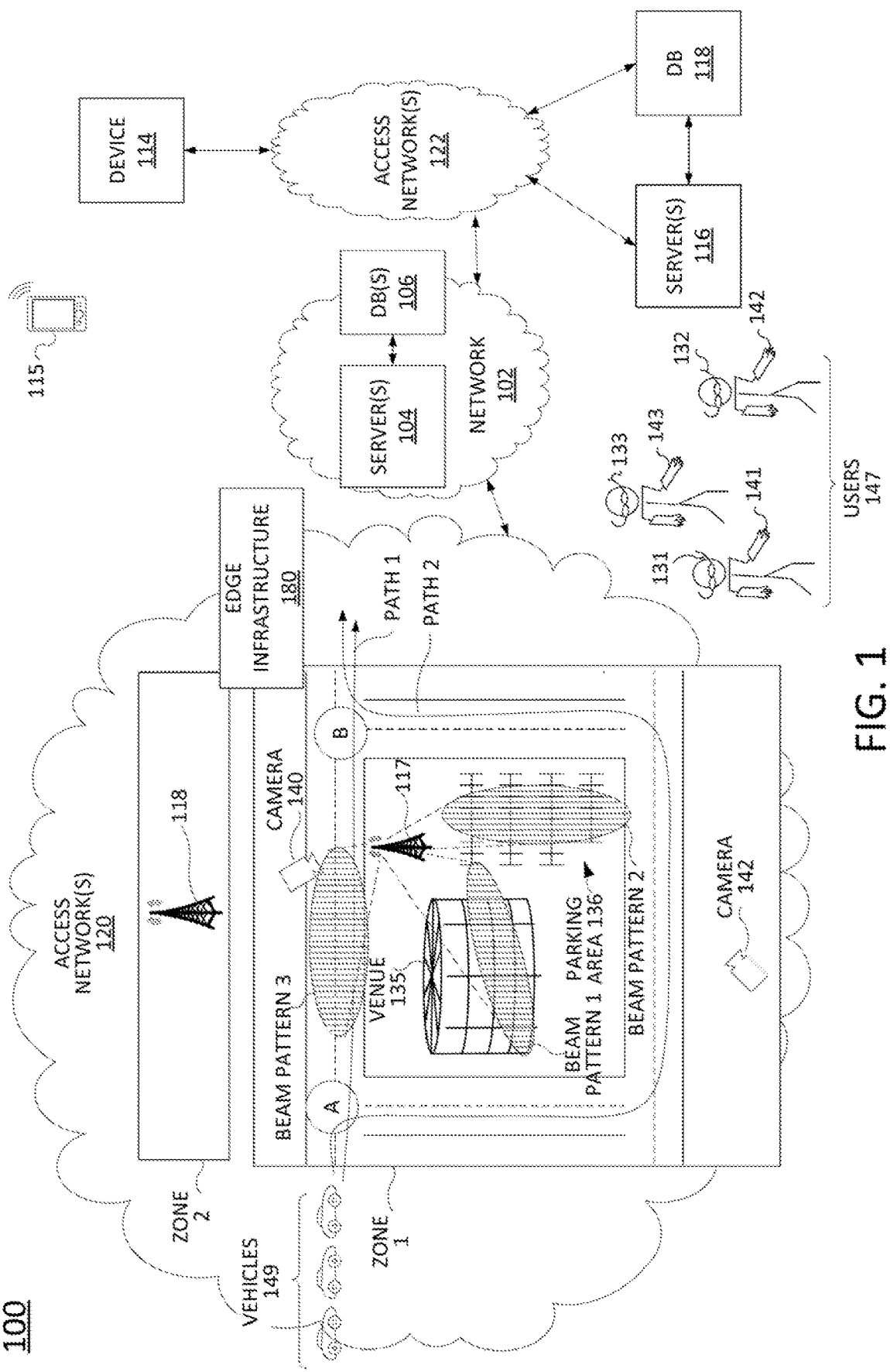
FIG. 1 illustrates an example network related to the present disclosure.

Examples of the present disclosure describe methods, computer-readable media, and apparatuses for providing a network service via a network zone of a telecommunication network with excess capacity to at least one entity of a set of entities present at a geographic location of the network zone and to which an invitation to utilize the network zone is transmitted. For instance, in one example, a processing system including at least one processor may identify a network zone with excess capacity, the network zone comprising a plurality of network components of a telecommunication network, transmit an invitation to a set of entities to utilize the network zone to obtain at least one network service at a geographic location of the network zone, configure at least one network component of the plurality of network components in accordance with an anticipated network demand from the set of entities, and provide the at least one network service to at least one entity of the set of entities via the network zone when the at least one entity is present at the geographic location of the network zone.

As connectivity grows for devices and high-throughput scenarios, the accessibility of high speed locations may not keep up with demand. Simultaneously, well-planned venues and hubs (e.g., 5G and beyond "hot zones") are being created that are devoted to providing optimized experiences while in physical range. For instance, these venues/hubs may include stadiums, arenas, concert facilities, race tracks, and so forth. Examples of the present disclosure identify these venues and telecommunication network infrastructure associated therewith (e.g., a network zone and the network components thereof). In addition, examples of the present disclosure may identify peak usage times (e.g., during a game or a concert at a stadium) and peak idle times (e.g., at a time when the team has an away game or during an off season when no games are scheduled for an extended period of time). In one example, the peak idle times (or other times when the network zone is predicted to be idle or relatively idle) may be proposed for opportunistic creation of high capacity network-centric events. Notably, some endpoint devices (e.g., user devices, autonomous vehicles, etc.) may have the ability to physically move to an optimized location for a network-centric event. However, these endpoints and/or their users, fleet owners and/or operators, event organizers, multi-participant extended reality (XR) experience providers (e.g., virtual reality (VR) platform providers/hosts), or the like may be unaware of how or when these extra resources are available. It should be noted that as referred to herein the term extended reality (XR) may include mixed reality (MR), augmented reality (AR), virtual reality (VR), or similar environments in which multiple users may explore and interact within a virtual space (which may include purely virtual spaces, or physical spaces having virtual features accessible via display screens of user devices, haptic devices, or the like).

In an illustrative example, the present disclosure may first find hotspot locations (or "rally points") for XR experiences (e.g., for massive multi-participant XR experiences, or "events," such as for 100 or more users, 1000 or more users, etc.), for high-bandwidth and/or high data communication needs of vehicular computing systems, and others. For instance, a system of the present disclosure may determine a venue that may support specific types of events (e.g., parking availability, usage of public areas, such as courtyards, stadium public areas, etc., and so forth).

In one example, when providing one or more network services in support of mass XR experiences or mass communications for vehicular computing systems, the system may monitor for bursty traffic, excessive utilization, or other violations. For instance, a system of the present disclosure may be deployed be a telecommunication provider network to manage the assignment of excess capacity in a network zone (and in some cases, for a plurality of network zones). In one example, when spare capacity of a network zone is assigned to mass XR experiences or mass communications for vehicular computing systems, the system may impose policies to restrict utilization to specific types of customers, endpoint device, or data traffic characteristics. For instance, the system may monitor traffic characteristics for endpoint devices obtaining network services via the network zone for consistency with the particular purpose for which the endpoint devices are invited to utilize the excess capacity of the network zone. For example, if users/endpoint devices are invited to travel to the network zone to participate in a mass XR event, to engage in communications for a vehicular computing system (such as firmware and/or software updates, uploading sensors and other vehicular operational and/or monitoring data, etc.), and so forth, and the system detects traffic that appears to be bulk downloading of ultra-high definition (UHD) videos, the system may block any endpoint devices that appear to be operating contrary to the invited event, may assign a lower quality of service (QoS) and/or quality class indicator (QCI), or otherwise restrict network traffic for such devices, such as by placing bandwidth limits, placing network traffic to or from these devices in lower priority queues, and so forth. In one example, these restrictions may not be just for offending traffic, but may be applied to all network traffic for such endpoint devices. For instance, this may result in an endpoint device being forced to a lower visual quality for a mass XR event than it would otherwise obtain via the network zone, as a consequence for an apparent violation of the scope of the invitation to obtain network services from the assigned network zone. Other policies/limitations on usage may relate to time, such as reducing service levels (e.g., QoS, QCI, or the like) for devices that stay beyond the end of a mass XR experience/event. In one example, if a zone/venue has a private network, the present disclosure may create a separate subnetwork with dedicated capacity, or may limit other uses of network resources in the network zone to address the event.

In one example, the system may offer dedicated performance, e.g., for latency/bandwidth, and may prioritize network traffic for organized events that occur in accordance with invited utilization of excess/spare capacity of a network zone. To illustrate, an organizer of mass XR experiences/events may want to host a new event and may request that the telecommunication network operator find one or more available locations (e.g., network zones) at which high bandwidth-mass network services may be obtained. In one example, the system may find one or more locations for specific requested dates and/or times, or may provide a list of one or more available locations that may match the anticipated needs for the event, the dates and/or times of such availability, a cost, available additional services (such as parking, restrooms, food, etc.), and so forth.

In one example, the system may automatically notify city management and/or law enforcement systems for the network zone of any events that are scheduled in accordance with an invitation to utilize excess capacity in the network zone. In one example, user endpoint devices may begin experiencing/participating in a mass XR event from a different location and may receive network services in support of delivering the mass XR experience/event while in transit to the network zone. In one example, the user may obtain a lesser service level for the mass XR event (e.g., lower resolution visual data, etc.) while in transit. Then, when the user/endpoint device arrives in the network zone, the telecommunication network may provide a higher service level for the mass XR event (e.g., supporting higher resolution data, additional active participation features, and so forth). For instance, the user may travel from a different location to a location within the network zone via an autonomous and/or self-operating vehicle and may continue to experience/participate in the mass XR experience/event while in transit.

As noted above, in one example, vehicles within a fleet of vehicles may be directed to the network zone to engage in upload and/or download of large data volumes (e.g., software and/or firmware updates, sensor data uploads, etc.). In one example, the system may identify vehicular or other road traffic within the network zone, and may suggest routes to vehicles that may optimize the duration of time spent within the network zone (and hence the quantity of data upload and/or download that can be supported). For instance, highway 1 and highway 2 may both pass through the network zone. Highway 1 may be free flowing and it may be anticipated that it will only take a vehicle 2 minutes to pass through the network zone on highway 1. On the other hand, highway 2 may have traffic congestion and it may be anticipated that it may take a vehicle 5 minutes to pass through the network zone on highway 2. Thus, in an illustrative example in which a data upload need per vehicle is 15 GB, if the network zone is able to provide an average per-user equipment (UE) upload bandwidth of 62 MB/s (500 Mb/s), then 4 minutes may be needed to complete an upload. In this case, the vehicle may be directed to highway 2 in connection with utilizing the excess capacity of the network zone in accordance with the invitation. Notably, transiting the network zone via highway 1 would provide insufficient time to complete an upload. However, transiting the network zone via highway 2 may enable a vehicle to complete the data upload while only causing the vehicle to experience one extra minute of traffic beyond what is useful for delaying the vehicle so as to facilitate the completion of the data upload (and so on, for other vehicles within a fleet of vehicles that may similarly have data upload requirements).

In one example, the present disclosure may migrate computing resources to network edge infrastructure (e.g., edge hosts integrated within the radio access network). For instance, a gaming company may host a VR event with participants physically present at a stadium. In one example, user preferences, user-specific data, such as avatar accessories, local media that may be shareable within the VR event, and so forth may be migrated to the edge.

In one example, the present disclosure may utilize excess network capacity by allowing autonomous vehicles to drive to a network zone and remain in the network zone while fulfilling a data upload and/or download need (e.g., to park at a stadium at night to upload sensor data). In addition, in one example, the present disclosure may create, provide, or facilitate ephemeral XR events hosted at a location (e.g., within a network zone). For instance, an entity hosting XR experiences may be looking for a location and time that is capable of supporting a specific activity, e.g., an XR concert, or the like. The system may identify an appropriate network zone with anticipated excess capacity to offer to the XR hosting entity. In one example, the system may also offer extra compute resources and services (such as network traffic prioritization, minimization of additional network traffic for non-participating user equipment, etc.).

In one example, potential network zones may be identified and known in advance, e.g., network zones with components that provide network services for stadiums, arenas, concert venues, convention halls, or other mass gathering venues. In one example, terms of use of real property may be established in advance between the telecommunication network operator and property owners, operators, lessees, etc. For instance, permission to park for free during overnight hours at a stadium may be established, and so forth.

The network may identify network zones containing network components with high capacity and a substantial percentage of idle and/or low-usage times, e.g., predominantly mass gathering sports and entertainment venues, such as stadiums, arenas, concert venues, race tracks, etc. The network may maintain data records regarding each such network zone and the venue(s) within the network zone, such as the venue location, venue capacity, parking availability, availability of other amenities (e.g., restrooms, food stalls, etc.), network zone capacity, such as cell footprint/coverage data, beam steering data (e.g., to what extent the cell footprints may be changed through beam steering) peak throughput data (e.g., the maximum number of supported UEs, maximum per-UE uplink and downlink data rates, etc.), and so forth. The network may identify trends/patterns for peak and idle times, and may further obtain notifications from venue operators of scheduled events that may drive network utilization (e.g., scheduled sporting events, scheduled concerts, etc.). In one example, venue operators may provide notifications in a well-defined format, such as via an Extensible Markup Language (XML) form, or the like, which may include fields for venue ID, start time, end time, anticipated number of visitors, and so forth.

In one example, the network may identify multiple geographically distributed network zones (e.g., network zones with venues having high-capacity, low-utilization availability) that may be used in connection with a same mass XR event or a mass communications for vehicular computing systems event. For example, the network may correlate high capacity zones with users and/or endpoint devices by determining distances for certain endpoint devices to venues, and may begin to cluster endpoint devices in association with specific network zones and/or venues. To illustrate, the network may look for alternate (smaller) hubs near a user if the user is too far away from a primary venue/network zone, or if the primary venue/network zone is expected to be at capacity. Similarly, a user may obtain permission to utilize network services from a network zone (with a "ticket" or reservation, e.g., receiving an access or authorization code), but the network zone may become saturated before the user arrives. In such case, the network may find similar underutilized smaller network zones (and/or network zones within less overall available capacity) and reroute local users to such location(s) (e.g., a nearby civic building instead of a large stadium).

In one example, the network may also stagger endpoint devices by different time slots (such as for vehicular computing systems, which may be assigned 30 minute time slots, one hour time slots, etc. to utilize the excess capacity of a network zone). Similarly, in one example, the network may attempt to match the traversal/movement of users and/or endpoint devices to the network zones at specific times. For instance, the network may opportunistically invite or direct vehicles to divert to a network zone when such vehicles are already within or scheduled to be within a threshold proximity to the network zone. For instance, a truck delivering cargo from Boston to Baltimore may generally travel a number of different ways through the New York City area while in transit, all of which may have relatively equal transit times on average (but which may substantially vary on any given day due to accidents, road construction, weather, etc.). Thus, in one example, such a vehicle may be directed along a specific route to take advantage of excess capacity of a network zone associated with a venue for uploading and/or downloading of vehicular data.

Similarly, an executive may have a VR meeting to attend but may be in transit via an autonomous vehicle. In addition, the executive may not be able to reach an office or other stationary locations in time for the meeting. However, the vehicle may be directed along a route that passes through the network zone and that may have road traffic. Notably, the road traffic may be sufficient so as to delay the vehicle within the network zone long enough for the VR call to be completed. Thus, such a vehicle may also be directed into the network zone opportunistically. For instance, the executive/user may register a desired high-bandwidth and/or high-data communication need with the network for a specific time, or a range of preferred times. In response, the network may search for and locate available venues/network zones, and may direct the user and/or the user's vehicle to such network zone if available and within a reasonable distance (e.g., within a threshold distance of the user's location and/or within a threshold of added transit time from a current route that the user is currently travelling on).

Thus, the present disclosure identifies potential locations for high-data and/or high-bandwidth XR activities and matches the available network resources with specific events. In particular, a telecommunication network may publish and offer off-hours utilization of excess capacity in network zones (e.g., associated with mass sporting event or other venues). In addition, the present disclosure may manage event access (where an event may include a mass XR event/experience or mass communications for vehicular computing systems event, e.g., for a fleet of vehicles), and may set limits, or allow organizers to set limits, based on optimal network availability. In one example, the present disclosure may also detect and alert of violators and handle sudden bursts of unexpected activity by throttling endpoint devices, notifying organizers, and so forth. In one example, the present disclosure may monitor an event, e.g., by gathering usage and performance data of the network zone and/or of the venue and venue amenities. In addition, the present disclosure may store and/or publish learnings from the monitoring and provide additional analytics. For instance, actual demand/usage for an XR event may have exceeded the capacity of the network zone. In this case, the telecommunication network may estimate higher demand for future XR events in the same area or from the same event organizer, may estimate higher per device data and/or bandwidth usage during XR events, and so forth. These and other aspects of the present disclosure are discussed in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a telecommunication network. The network 102 may be in communication with one or more access networks 120 and 122, and the Internet (not shown). In one example, network 102 may combine core network components of a cellular network with components of a triple play service network; where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/ Wi-Fi network and the like), cellular access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like. In one example, each of access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 include a wireless access point 117 and a wireless access point 118, e.g., cellular base stations. In particular, in one example, wireless access points 117 and 118 may comprise 5G base stations, each of which may include directional antennas and/or millimeter wave antennas to provide high data rate/high bandwidth communications to UEs being served, but which may comprise smaller cells (e.g., cell footprints/beam patterns) than wireless access points that may operate in lower bands (e.g., 4G/LTE, etc.). In one example, wireless access points 117 and 118 may comprise base stations integrating 5G components with 4G/LTE components for mixed use.

In one example, the access networks 120 may be in communication with various devices or computing systems/ processing systems, such as user endpoint devices (such as XR headsets 131-133), camera 140, camera 142, vehicle(s) 149, and so forth (e.g., via wireless access points 117 and/or 118). Similarly, access networks 122 may be in communication with one or more devices, e.g., device 114, server(s) 116, database (DB) 118, etc. Access networks 120 and 122 may transmit and receive communications between XR headsets 131-133, camera 140, camera 142, vehicles 149, device 114, server(s) 116, database (DB) 118, application server (AS) 104 and/or database (DB) 106, other components of network 102, devices reachable via the Internet in general, and so forth.

In one example, device 114 may comprise a mobile device, a cellular smart phone, a laptop, a tablet computer, a desktop computer, a wearable computing device (e.g., a smart watch, a smart pair of eyeglasses, etc.), an application server, a bank or cluster of such devices, or the like. In one example, device 114 may be associated with a vehicle fleet manager, an organizer or provider of mass XR events, and so forth. Cameras 140 and 142 may be mounted in locations such as rooftops, signposts, etc. and may be directed at roads within a network zone (zone 1). It should be noted that a telecommunication network may include multiple network zones, which may comprise one or more cells. Thus, for example, two network zones, zone 1 and zone 2 (which may also be considered part of access network(s) 120), are illustrated in FIG. 1.

In accordance with the present disclosure, vehicles 149 may each include on-board computing systems, or on-board units (OBUs), and one or more radio frequency (RF) transceivers for cellular communications and/or for non-cellular wireless communications. In one example, each of the vehicles 149 may also include one or more sensors or additional controllable components, such as one or more infrared, ultraviolet, and/or visible spectrum light sources, a light detection and ranging (LiDAR) unit, a radar unit, a Global Positioning System (GPS) unit, tire pressure gauges, one or more cameras, fuel tank gauges, a washer fluid monitoring sensor, a fuel oil sensor, and so forth. With no loss of generalization, several other classes of vehicles 149 may also include aerial drones, land-based delivery drones, aquatic exploration vehicles, low-earth-orbit (LEO) satellites or satellite-based drones, and high capacity vehicles like trucks, cargo-vessels, subway-, train-, or bus-based pods or cars. In each of these examples, additional internal sensors including capacity awareness, utilization, temperature control, battery level, moisture level, sonar, etc. may provide actionable information or controllable components for use with the system.

As illustrated in FIG. 1, users 147 may also possess force feedback gloves 141-143 for XR experiences. In one example, force feedback gloves 141-143 may communicate independently with access networks 120. In another example, each of force feedback gloves 141-143 may communicate with remote devices, servers, or the like via access networks 120, network 102, etc. via another endpoint device, such as XR headsets 131-133. In still another example, force feedback gloves 141-143 may comprise peripheral devices that provide input data to and receive output data from XR headsets 131-133, respectively, but do not communicate with any other entities.

As illustrated in FIG. 1, access network(s) 122 may be in communication with one or more servers 116 and one or more databases (DB(s)) 118. In accordance with the present disclosure, each of the server(s) 116 may comprise a computing system or server, such as computing system 400 depicted in FIG. 4, and may individually or collectively be configured to perform operations or functions in support of examples of the present disclosure for providing a network service via a network zone of a telecommunication network with excess capacity to at least one entity of a set of entities present at a geographic location of the network zone and to which an invitation to utilize the network zone is transmitted (such as illustrated and described in connection with the example method 200 of FIG. 2 and/or the example method 300 of FIG. 3). For instance, server(s) 116 may comprise host servers for XR events. For instance, the server(s) 116, or server(s) 116 in conjunction with one or more of DB(s) 118 may comprise an XR host system in accordance with the present disclosure. In one example, server(s) 116, or server(s) 116 in conjunction with one or more of DB(s) 118 may alternatively or additionally comprise a vehicle fleet management system in accordance with the present disclosure.

In one example, DB(s) 118 may comprise one or more physical storage devices integrated with server(s) 116 (e.g., a database server), attached or coupled to the server(s) 116, or remotely accessible to server(s) 116 to store various types of information in support of systems for providing a network service via a network zone of a telecommunication network with excess capacity to at least one entity of a set of entities present at a geographic location of the network zone and to which an invitation to utilize the network zone is transmitted, in accordance with the present disclosure. In one example, DB(s) 118 may represent a distributed file system, e.g., a Hadoop® Distributed File System (HDFS™), or the like. To illustrate, in one example, server(s) 116 may receive and store in DB(s) 118 information regarding users (e.g., names, user identifiers (IDs), age, preferences (such as for types of XR events, particular XR event hosts, subject matter, etc.) and user devices (e.g., UEs), such as device identifiers (e.g., IMEI, IMSI, hardware identifiers, etc.), In addition, server(s) 116 may receive and store in DB(s) 118 information regarding XR event hosts (such as an XR event host associated with device 114), which may include an identifier (e.g., a user ID that identifies the host, which may be an organization rather than an individual), account information, such as current credits or balances, preferences for hosting XR events (e.g., an XR event host may be seeking to host new XR events opportunistically when excess network capacity is available from access network(s) 120 and may be offered by the telecommunication network operator), and so forth. In one example, DB(s) 118 may also store data representing a virtual environment, such as data describing a geography and bounds of a virtual space, the terrain of the virtual space, any buildings or other fixtures of the virtual space, moveable virtual objects that may be present in the virtual space and that may be interacted with by users (or by user representations (e.g., avatars, or the like)) within the virtual space, rules for movement and interaction within the virtual space (e.g., the physics of the space, permitted actions within the space, etc.), information regarding user representations (e.g., avatars), such as visual data of the user representations (e.g., a 3D object model representing the user), any items/objects possessed by the user representation, any specific capabilities of the user representation beyond default capabilities that may be available to all user representations (e.g., the user representation may have the ability to "fly," while others may not), and so forth.

Alternatively, or in addition, in one example, server(s) 116 may receive and store in DB(s) 118 information regarding vehicles in a fleet such as, for each vehicle: an identifier of the vehicle, a maximum operational range of the vehicle, a current operational range of the vehicle based on fuel/charge levels, capabilities or features of the vehicle such as maneuvering capabilities, payload/lift capabilities (e.g., including maximum weight, volume, etc.), the sensors installed and in operation on the vehicle, and so forth. In addition, server(s) 116 may receive and store in DB(s) 118 sensor data, such as tachometer data, braking data, turning data (e.g., indicating status of a steering wheel or steering column at successive times), charge, fuel, or other power capacities/levels, camera data, LiDAR data, location information (e.g., maintained over days, weeks, months, etc., with user permission), and so forth. In one example, DB(s) 118 may alternatively or additionally store data for downloading to vehicles, such as firmware or software updates for providing to on-board units (OBUs) or any vehicle sub-systems, additional data, such as a list of vehicle noting which vehicles have already received an update and which vehicles are still in need of an update, and so forth.

Figure 4:
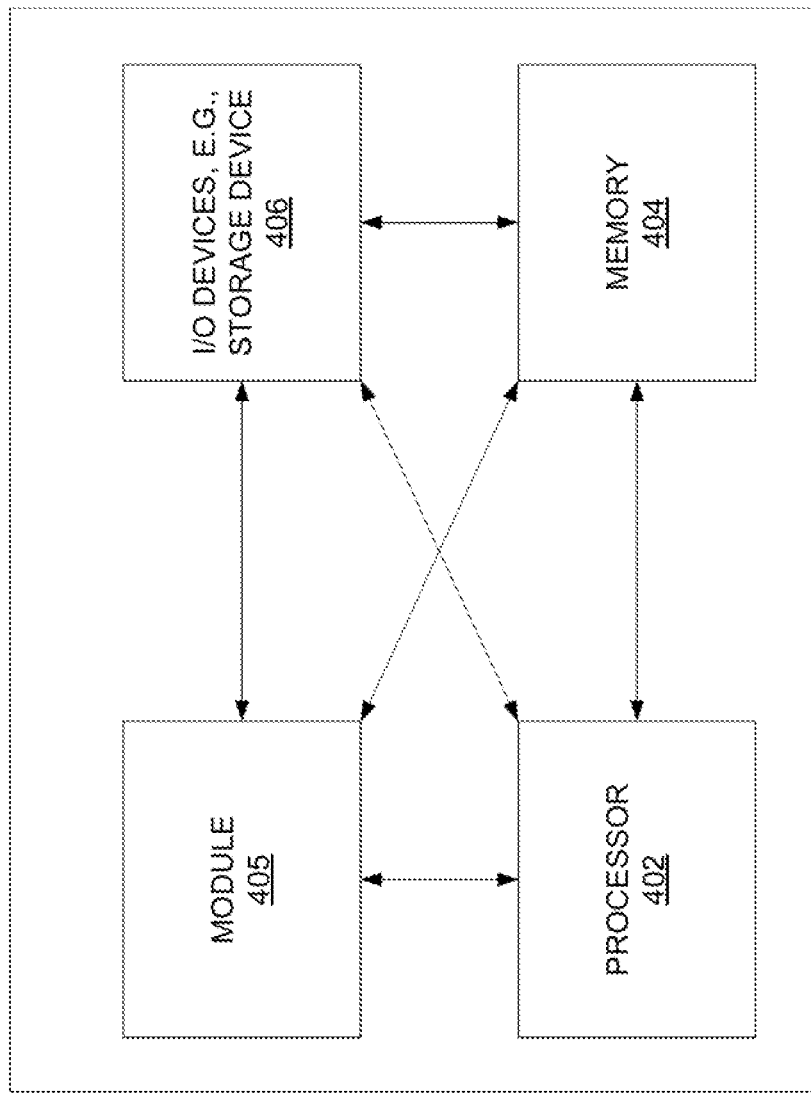
FIG. 4 illustrates a high level block diagram of a computing device specifically programmed to perform the steps, functions, blocks and/or operations described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, server(s) 104 may comprise one or more servers providing an excess network capacity management service for a telecommunication network operator. For instance, server(s) 104 may track the utilization and capacities of different network zones, such as in access network(s) 120, to determine when there may be idle/low-utilization times that can be offered for use in connection with multi-participant XR events (such as for 100 or more users, 1000 or more users, etc.), for high-bandwidth and/or high data communication needs of vehicular computing systems, or the like. In this regard, DB(s) 106 may comprise one or more physical storage devices integrated with server(s) 104 (e.g., a database server), attached or coupled to the server(s) 104, or remotely accessible to server(s) 104 to store various types of information for tracking and managing the use of excess/spare capacity of network zones. To illustrate, server(s) 104 may gather and store in DB(s) 106 historical utilization information from zone 1 and zone 2 (e.g., from wireless access points 117, 118, etc.), such as throughput metrics, peak and average numbers of UEs served (e.g., per 5 minute time block, per 30 minute time block, etc.), average UE bandwidth utilization and/or data utilization per connection, average duration of connection, numbers of carriers utilized and/or spare/idle, and so forth. Server(s) 104 may also gather and store in DB(s) 106 historical event information pertaining to network zones. For instance, as noted above, certain zones may be known in advance and designated as candidate zones for offering excess capacity for multi-participant XR events and/or for high-bandwidth/high data communication needs of vehicular computing systems.

In particular, these zones may be associated with venues for mass event, such as zone 1, including venue 135, and may have network equipment that have been deployed specifically to address the high demand that comes with a large concentration of users and UEs. For instance, wireless access point 117 may comprise a 5G base station that is configured with beam pattern 1 to maximize coverage within the venue 135 and which may be capable of servicing thousands of UEs concurrently (e.g., through time, frequency, coding, and/or spatial multiplexing, etc.). However, it may be the case that venue 135 is only used sporadically for major events on average of 2-3 times per week for a particular season, and which may last on average around 3 hours per event. At other times, the utilization of network zone 1 (e.g., the utilization of wireless access point 117) may be very low (e.g., less than 20 UEs connected at any one time, less than 100 UEs connected at any one time, etc.). In one example, an operator of venue 135 may provide information regarding scheduled events, which may then be temporally correlated to associated usage metrics of zone 1/wireless access point 117.

Accordingly, server(s) 104 may learn patterns of high-use and low-use times of zone 1/wireless access point 117 (for instance, it may be the case that there is high-use for all scheduled events, "medium" use for certain times of day, such as rush hour, and idle/low-use at all other times). As such, server(s) 104 may make available excess/spare capacity at times in which zone 1/wireless access point 117 are predicted to be low-use/idle (e.g., all times at which there are no scheduled events at venue 135 and which are not otherwise predicted to be "medium" use or above). In addition, in one example, server(s) 104 may also store in DB(s) 106 information pertaining to entities that may wish to utilize excess capacity of network zones for multi-participant XR events and/or for high-bandwidth/high data communication needs of vehicular computing systems. For instance, DB(s) 106 may store identifications of XR event hosts, vehicle fleet managers, or the like. In addition, DB(s) 106 may store information regarding requested new events. For instance, an XR event host may provide information relating to a new event that the XR event host would like to provide, such as an anticipated number of participants, an average bandwidth and/or data utilization per participant (which may be further specified by upload and/or download predicted utilization), a desired date, or range of dates, desired time periods (e.g., daytime, evenings, weekends, Friday or Saturday evening only, after 10:00 PM Thursday or Friday only), etc.), any additional services that may be relevant (e.g., minimum parking preference, restroom availability preference, and/or food availability preference), and so forth.

In a first illustrative example, an XR event host may indicate a desire to host a new XR event, e.g., sometime during a weekend evening in the next two weeks. For example, the XR event host may use device 114 to communicate this request to server(s) 104. Server(s) 104 may then continue to monitor network zones within access network(s) 120 to identify when excess capacity may be available to meet the request of the XR event host. In this case, for illustrative purposes, server(s) 104 may identify that zone 1 will have spare capacity on Friday night from 7:00 PM to at least 8:00 AM the next morning. For instance, server(s) 104 may determine from the record(s) in DB(s) 106 that there is no scheduled event at venue 135 on Friday evening and that the anticipated utilization of zone 1/wireless access point 117 will still be low/idle. As such, server(s) 104 may transmit a notification and/or offer to the XR event host, e.g., at device 114. The notification or offer may include additional information, such as pricing information (for instance, the telecommunication network operator may choose to charge based upon a number of participants of an event, a total data utilization of participants of an event (who are specifically directed to a network zone in accordance with the present disclosure), a duration of the event, and so forth), the time range of availability (e.g., the XR event host may select to have a 2 hour event, a 3 hour event, etc.), a maximum number of participants/UEs that may be concurrently served within the network zone (e.g., zone 1), information on additional amenities (e.g., parking, restrooms, etc.), and so forth.

In the event that the XR event host chooses to utilize the available time slot, a response may be transmitted from device 114 to server(s) 104. In such case, server(s) 104 may then engage in additional operations in preparation of the usage of zone 1 for the upcoming XR event. For instance, in one example, server(s) 104 may generate one or more tokens (e.g., passcodes, or the like) to be used in connection with the XR event in order to receive network services, or prioritized network services via zone 1/wireless access point 117. For example, the tokens may be provided to the XR event host to be stored in DB(s) 118. The XR event host may then advertise the XR event to potential participants, e.g., users 147 via XR headsets 131-133, or other devices, such as via mobile smartphones, home computers, etc. For instance, the XR event host may cause server(s) 116 to transmit invitations to users 147, which may contain links to a webpage with event information, registration information, etc. For illustrative purposes, it may be assumed that all of the users 147 have provided responses via respective devices indicating intention to participate in the XR event. For instance, users 147 may have completed an online form and payment process in order to complete registration. In response, server(s) 116 may then present receipts, digital "admission tickets," or other confirmation of registration. In addition, in one example, the receipts, admission tickets, or the like may include a token to gain network services in zone 1/via wireless access point 117 in connection with the XR event. Alternatively, or in addition, server(s) 116 may transmit the token(s) at a later time, but still in advance of the event, e.g., 1 day before the event, 1 hour before the event, etc.

In one example, server(s) 104 may transmit reconfiguration instruction(s) to one or more components of zone 1 to better serve the XR event. For instance, the instruction(s) may be for the wireless access point to change a current beam pattern 1 to new beam pattern 2 to provide better coverage to parking area 136. For instance, during major events at venue 135, the typical beam pattern may be beam pattern 1 to serve the large number of users anticipated to be inside the venue 135. However, for opportunistic XR events, the venue 135 itself may be closed, but the parking area 136 may be made available for participant use. In addition, this amenity may be known in advance by the telecommunication network operator so as to enable server(s) 104 to send instructions to change the beam pattern, and for the new beam pattern 2 to be pre-programmed for wireless access point 117. For instance, wireless access point 117 may include antennas (e.g., remote radio heads (RRHs)) that may have mechanical and/or electrical tilt/beam steering capabilities that can be remotely programmed and controlled.

In one example, users 147 may arrive at zone 1 and may seek to connect to wireless access point 117 to receive network services (e.g., including to gain access to the XR event). In one example, wireless access point 117 may be provided with a list of device identifiers (e.g., including of XR headsets 131-133) that are participating the in XR event. In one example, wireless access point 117 may be configured to grant network access to such devices associated with the device identifiers in the list. In one example, other UEs may be permitted to attach/connect via wireless access point 117, but may be provided with a lesser service level than that which is assigned to and provided for participants in the XR event. Alternatively, or in addition, XR devices 131-133 may present the abovementioned token(s) to wireless access point 117, upon which wireless access point 117 may complete a network attach procedure for such devices (and in one example, may further assign a particular quality class indicator (QCI), e.g., a particular service level, to such devices). In another example, wireless access point 117 may permit endpoint devices to attach to the network, at a restricted service level. Devices such as XR devices 131-133 may then present token(s) to server(s) 104 via access network(s) 120, network 102, etc. Upon verification by server(s) 104, server(s) 104 may then instruct wireless access point 117 to grant an enhanced level of service to XR devices 131-133.

Continuing with the present example, the XR event may be a VR event hosted/provided by server(s) 116. Thus, for example, server(s) 116 may provide respective data feeds pertaining to a region of a virtual environment experienced by the respective users 147 (e.g., the region(s) of the virtual environment in which the representations of users 147 are present). It should be noted that the virtual environment may represent a substantial volume of virtual space. As such, for each of the users 147 (and others), the server(s) 116 hosting the VR event (and hence hosting the virtual environment) may provide respective data feeds to XR headsets 131-133 for rendering the virtual environment from different user perspectives. In other words, each data feed may include less than all of the data representing the state of the virtual environment at a given point in time, or times. For example, each of the XR headsets 131-133 may be provided with just enough data to render a respective one of the user perspectives. Any visual or other data beyond the perspective may be omitted from the respective data feed. However, it should be noted that in one example, data for rendering aspects of the virtual environment that are just beyond the view/perspective may also be included in the data feed. For instance, if one of the users 147 (e.g., the representation of the user) is moving very quickly in the virtual environment or changes the direction of view very quickly, the data feed may include additional data to enable the user's XR headset to quickly render from the changed perspective. Thus, some data of the feed may go unused for rendering, but may be available if needed depending upon the actions of the user.

In one example, a data feed may comprise a volumetric video, a 360 degree video, or the like. In one example, a data feed may comprise visual data for a respective viewport (e.g., for one of XR headsets 131-133, a view from a current location (or one or more predicted locations)) within the virtual environment and in current direction (or one or more predicted directions of view). In one example, the data feeds for users 147 may be generated by server(s) 116 by blending data regarding fixed or relatively fixed features of the virtual environment (e.g., terrain, buildings, etc.), with data regarding moveable objects and user representations. For instance, this data may be maintained in DB(s) 118 and retrieved in connection with serving different users engaging in VR experiences (e.g., including at least the VR event). Alternatively, or in addition, data regarding fixed or relatively fixed features of the virtual environment may initially be provided to XR headsets 131-133. Dynamic features may then be described to XR headsets 131-133 via subsequent data of the respective data feeds (e.g., changes in the perspective of a user and/or changes in the location of the representation of the user, and hence corresponding changes in the respective view/perspective, etc.). It should be noted that server(s) 116 may provide VR experiences in the virtual environment to other users who are non-participants in the special invitation only VR event. For instance, the VR event may be hosted at a particular virtual location within the virtual environment. In addition, server(s) 116 may enforce an attendance policy in which only user representations of participating/attending users are permitted to enter the specific virtual location of the VR event.

In one example, the telecommunication network operator may also make available edge infrastructure 180 to support the XR event. For instance, in one example, data defining the virtual environment from DB(s) 118 may be replicated and stored in edge infrastructure 180. Similarly, server logic of server(s) 116 for providing XR experiences (e.g., VR data feeds) to user devices may be migrated to the edge infrastructure 180. For instance, one or more of the server(s) 116 may be replicated as one or more virtual machines (VMs) or the like instantiated on host hardware devices of the edge infrastructure 180 (e.g., host servers). Thus, in one example, data feeds for the VR event may be provided to XR headsets 131-133 from edge infrastructure 180 via wireless access point 117 for reduced latency, reduced buffering, and the like.

In one example, wireless access point 117 may monitor the network utilizations of XR headsets 131-133 (and other participants) during the VR event. For instance, wireless access point 117 and/or server(s) 104 may monitor the volume of network traffic to and from such devices, as well as the characteristics of the traffic (e.g., without consideration of any user's specific private data). For example, wireless access point 117 and/or server(s) 104 may distinguish between network traffic for a VR experience and traffic that appears to be bulk downloading of high definition video based upon high level characteristics of the traffic. For instance, IP addresses of server(s) 116 may be known. As such, network traffic to or from such addresses may be considered to be part of the VR event. Alternatively, traffic to unknown IP addresses may be considered to be other traffic and may be blocked or rate limited (e.g., downgraded to a different service level or QCI), a warning may be presented to an XR headset (or other endpoint) to keep network utilization within the scope of the XR event, and so forth. Other aspects of traffic to or from user devices may also be used to distinguish between valid traffic for the VR event and other uses. For instance, other aspects may include average data burst size, packet inter-arrival time, a ratio of upload to download packets, and so forth. As such, the telecommunication network operator may seek to enforce a policy that user devices of participants in the VR experience exclusively or primarily utilize network services in zone 1, e.g., via wireless access point, for the invited VR event/experience.

In a second illustrative example, a vehicle fleet manager may indicate a desire for a mass communications for vehicular computing systems event (e.g., for uploading/offloading data from a fleet of vehicles and/or for downloading data, such as firmware or software updates, to the fleet of vehicles). For example, the vehicle fleet manager may use device 114 to communicate this request to server(s) 104. Server(s) 104 may then continue to monitor network zones within access network(s) 120 to identify when excess capacity may be available to meet the request of the vehicle fleet manager. In this case, for illustrative purposes, server(s) 104 may identify that zone 1 will have spare capacity on Friday night from 7:00 PM to at least 8:00 AM the next morning. For instance, server(s) 104 may determine from the record(s) in DB(s) 106 that there is no scheduled event at venue 135 on Friday evening and that the anticipated utilization of zone 1/wireless access point 117 is still low/idle. As such, server(s) 104 may transmit a notification and/or offer to the vehicle fleet manager, e.g., at device 114. The notification or offer may include additional information, such as pricing information (for instance, the telecommunication network operator may choose to charge based upon a number of vehicles (e.g., "participants"), a total data utilization of the vehicles (which may be specifically directed to a network zone in accordance with the present disclosure), a duration of the event, and so forth), the time range of availability (e.g., the vehicle fleet manager may select to utilize the network zone for the mass communications for vehicular computing systems event for 2 hours, for 3 hours, etc.), a maximum number of vehicles that may be concurrently served within the network zone (e.g., zone 1), information on additional amenities (e.g., parking, charging stations, etc.), and so forth.

It should be noted that a fleet may include a plurality of vehicles that are owned, managed, or otherwise controlled by an entity, such as a fleet of delivery vehicles of a delivery service company, a fleet of taxicabs, or the like. Alternatively, or in addition, a fleet may comprise a plurality of similar vehicles, such a vehicles of a same make and/or model. For instance, all instances of vehicle X by manufacturer Y may be a "fleet," or all instances within an area or range (e.g., all of vehicle X by manufacturer Y within the state Z). Notably, a large percentage of current automobiles include various on-board computing systems (broadly "on-board units" or OBUs) which may collect sensor data, and which may have the same or similar software and/or firmware across different vehicles. In addition, the vehicle manufacturers may maintain and update such software and firmware, and may push updates out to vehicles in service. It should be noted that vehicles in a fleet may comprise autonomous and/or self-operating vehicles, human operated vehicles, vehicles that are capable of self-operation or human operation, and so forth.

In the event that the vehicle fleet manager chooses to utilize the available time slot, a response may be transmitted from device 114 to server(s) 104. In such case, server(s) 104 may then engage in additional operations in preparation of the usage of zone 1 for the upcoming mass communications for vehicular computing systems event. For instance, in one example, server(s) 104 may generate one or more tokens (e.g., passcodes, or the like) to be used in connection with the event in order for vehicles associated with the fleet manager (e.g., vehicles in the fleet, such as vehicles 149) to receive network services, or prioritized network services via zone 1/wireless access point 117. For example, the tokens may be provided to the vehicle fleet manager to be stored in DB(s) 118. The vehicle fleet manager may then provide the token(s) to vehicles 149 from server(s) 116 in advance of the event, e.g., 1 hour before the event, 2 hours before the event, etc. In one example, not all vehicles in a fleet may be available or able to participate in the event. As such, in on example, the token(s) may be transmitted to vehicles 149 when it is confirmed that vehicles 149 will be participating. For instance, it may be determined by vehicles 149, server(s) 116, or both, that vehicles 149 are within a vicinity of zone 1 (e.g., within a threshold distance or driving time) and are not reserved or scheduled for use that would prevent such vehicles from travelling to zone 1 during the designated time(s) of the event in order to upload or download data, e.g., from respective on-board units of such vehicles. However, in another example, the token(s) may be provided to all vehicles in the fleet, or all vehicles having a designated association with zone 1 (e.g., all vehicles in the fleet having an assigned storage facility within a threshold distance of zone 1, all vehicles in the fleet with owners having registered addresses within a threshold distance of zone 1, etc.). In such case, individual vehicles and/or the vehicles' owners, operators, or the like may determine if and when the vehicles may be able to partake in the event, or not. In an example in which vehicles of the fleet are not owned by the fleet manager (e.g., for a manufacturer's software update to be pushed to individually-owned vehicles), there may be an incentive offered to the vehicles and/or the owners or operators thereof to participate in the event (e.g., rather than to obtain the software update in another way, such as using home broadband internet connection, etc.). For instance, the offer may be for free battery charging during the update, for no fees for cellular data usage from the telecommunication network operator (which may be established in advance between the vehicle fleet manager and the telecommunication network operator, e.g., via device 114 and server(s) 104), and so forth.

In one example, server(s) 104 may transmit instruction(s) to cause one or more components of zone 1 to reconfigure to better serve the event. For instance, in one example, the instruction(s) may be for wireless access point to change a beam pattern to beam pattern 2 to provide better coverage to parking area 136. However, in another example, the instruction(s) may alternatively or additionally be for the wireless access point to change a beam pattern to beam pattern 3 to provide better coverage to a roadway. In addition, this reconfiguration may be known in advance by the telecommunication network operator so as to enable server(s) 104 to send instructions to change the beam pattern, and for the new beam pattern 3 to be pre-programmed for wireless access point 117. For instance, wireless access point 117 may include antennas (e.g., remote radio heads (RRHs)) that may have mechanical and or electrical tilt/beam steering capabilities that can be remotely programmed and controlled.

In one example, vehicles 149 may arrive at zone 1 and may seek to connect to wireless access point 117 to receive network services (e.g., for uploading sensor data from OBUs, to receive firmware of software updates, or the like). In one example, wireless access point 117 may be provided with a list of device identifiers (e.g., including of vehicles 149) that are participating in the event. In one example, wireless access point 117 may be configured to grant network access to such vehicles associated with the device identifiers in the list. In one example, other UEs may be permitted to attach/connect via wireless access point 117, but may be provided with a lesser service level than that which is assigned to and provided for participants in the event (e.g., vehicles in the fleet). Alternatively, or in addition, vehicles 149 may present the abovementioned token(s) to wireless access point 117, upon which wireless access point 117 may complete a network attach procedure for such vehicles (and in one example, may further assign a particular quality class indicator (QCI), e.g., a particular service level, to such devices). In another example, wireless access point 117 may permit vehicles to attach to the network at a restricted service level. Vehicles 149 may then present token(s) to server(s) 104 via access network(s) 120, network 102, etc. Upon verification by server(s) 104, server(s) 104 may then instruct wireless access point 117 to grant an enhanced level of service to vehicles 149. In one example, the telecommunication network operator may also make available edge infrastructure 180 to support the event. For instance, in one example, software or firmware update data from DB(s) 118 may be replicated and stored in edge infrastructure 180.

In one example, wireless access point 117 may monitor the network utilizations of vehicles 149 (and other UEs) during the event. For instance, wireless access point 117 and/or server(s) 104 may monitor the volume of traffic to and from such vehicles, as well as the characteristics of the traffic (e.g., without consideration of any user's or vehicle's specific private data). For example, wireless access point 117 and/or server(s) 104 may distinguish between sensor data offload traffic and traffic that appears to be bulk downloading of high definition video based upon high level characteristics of the traffic. For instance, IP addresses of server(s) 116 may be known. As such, traffic to or from such addresses may be considered to be part of the event. Alternatively, traffic to unknown IP addresses may be considered to be other traffic and may be blocked or rate limited (e.g., downgraded to a different service level or QCI), a warning may be presented to a vehicle (or other endpoint) to keep network utilization within the scope of the event, and so forth. Thus, for example, a user may not navigate or permit the user's vehicle to navigate to zone 1 and attempt to engage in other high data rate network usage. Other aspects of traffic to or from vehicle or other endpoint devices may also be used to distinguish between valid traffic for the event and other uses. For instance, other aspects may include average data burst size, packet inter-arrival time, a ratio of upload to download packets, and so forth. As such, the telecommunication network operator make seek to enforce a policy that vehicles in the fleet exclusively or primarily utilize network services in zone 1, e.g., via wireless access point 117, for the invited event.

It should be noted that in some cases, the anticipated data transmissions may be of a particular data volume, or the fleet manager or vehicle owners may prefer that the vehicles not actually stop within zone 1 for the event (e.g., for the data upload and/or download for each vehicle). In one example, server(s) 104, server(s) 116, and/or the vehicles 149 individually may calculate a route through zone 1 that will enable vehicles 149 to remain within communication range of wireless access point 117 for a sufficient duration of time to complete the data transmission(s) associated with the event. For instance, server(s) 104, server(s) 116, and/or the vehicles 149 individually may monitor traffic conditions within zone 1, may select a route, or routes, with an anticipated traffic delay to meet an anticipated network demand (e.g., anticipated data usage) for each of vehicles 149 to maintain a presence within zone 1 for a target duration of time (e.g., where the target duration of time is calculated based upon an anticipated data volume and a per vehicle uplink and/or downlink data rate that may be provided by the wireless access point 117).

In one example, this may include directing a vehicle into traffic or directing a vehicle to take a non-direct route (e.g., to meet the entire demand, or to keep the vehicle in range for a maximum allowable duration of time; for instance, a fleet operator may set a maximum delay of 15 minutes, which is not enough to meet the entire demand, but which may allow a vehicle to complete a large percentage of a desired upload and/or download). For instance, in the example of FIG. 1, vehicles 149 may be traveling in an area and may pass through zone 1, such as all of vehicles 149 being delivery vehicles that may eventually return to a dispatch center that may be reached through zone 1. In this case, a direct route from point A to point B may be along path 1. However, vehicles 149 may be directed along path 2, which may be longer, but which may keep vehicles 149 within zone 1 (and within range of wireless access point 117) long enough to complete or maximize a data transmission, without actually having to stop in zone 1, such as by parking in parking area 136. In another example, there may be significant traffic between point A and point B along the road indicated by path 1 which may be determined from cameras 140 and/or 142 (e.g., traffic cameras) or a traffic data service. A typical navigation program or navigation device (e.g., a Global Positioning System (GPS) navigation unit with traffic data service) may direct vehicles 149 along path 2, to avoid the traffic, and which may be faster than taking the shorter route along path 1. However, in accordance with the present disclosure, server(s) 104, server(s) 116, and/or the vehicles 149 may instead still use path 1, e.g., wherein the calculated/predicted traffic is anticipated to keep vehicles 149 within zone 1 for a threshold or target duration of time.

It should also be noted that the foregoing are just several examples of providing a network service via a network zone of a telecommunication network with excess capacity to at least one entity of a set of entities present at a geographic location of the network zone and to which an invitation to utilize the network zone is transmitted, and that other, further, and different examples may be established in connection with the example of FIG. 1. It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos or video segments that may be provided in accordance with the present disclosure. Similarly, although only two access networks 120 and 122 are shown, in other examples, access networks 120 and/or 122 may each comprise a plurality of different access networks that may interface with network 102 independently or in a chained manner. For example, device 114 and server(s) 116 may be in communication with network 102 via different access networks, cameras 140 and 142 may be in communication with network 102 via different access networks, and so forth. Thus, these and other modifications are all contemplated within the scope of the present disclosure.

Figure 2:
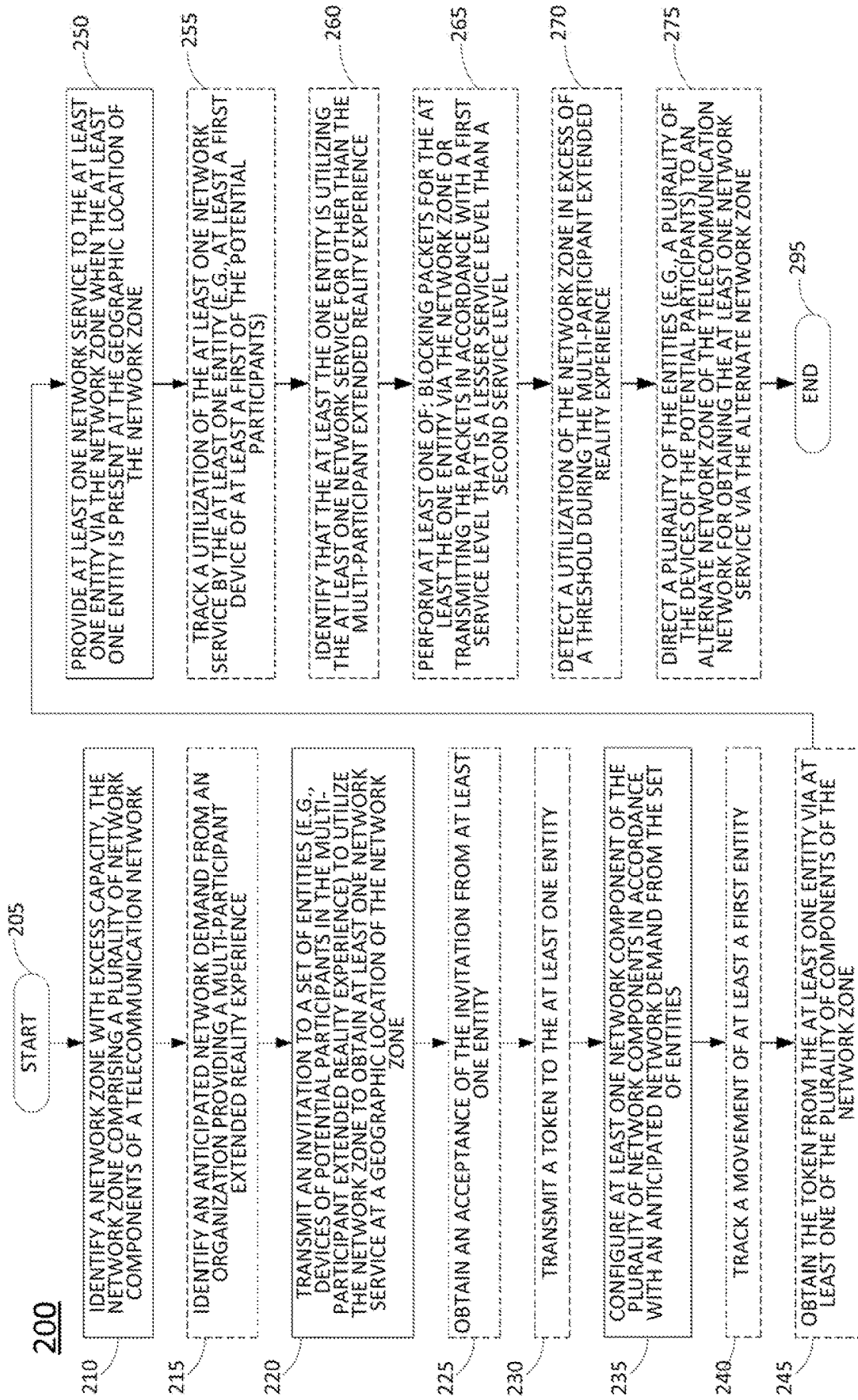
FIG. 2 illustrates a flowchart of an example method for providing a network service via a network zone of a telecommunication network with excess capacity to at least one entity of a set of entities present at a geographic location of the network zone and to which an invitation to utilize the network zone is transmitted (e.g., a method for providing a network service via a network zone of a telecommunication network with excess capacity to devices of potential participants in a multi-participant extended reality experience to which an invitation to utilize the network zone is transmitted)

FIG. 2 illustrates a flowchart of an example method 200 for providing a network service via a network zone of a telecommunication network with excess capacity to at least one entity of a set of entities present at a geographic location of the network zone and to which an invitation to utilize the network zone is transmitted (e.g., a method for providing a network service via a network zone of a telecommunication network with excess capacity to devices of potential participants in a multi-participant extended reality experience to which an invitation to utilize the network zone is transmitted), in accordance with the present disclosure. In one example, the method 200 is performed by a component of the system 100 of FIG. 1, such as by server(s) 104, and/or any one or more components thereof (e.g., a processor, or processors, performing operations stored in and loaded from a memory), by server(s) 104 in conjunction with one or more other devices, such as DB 106, server(s) 116, DB(s) 118, device 114, and so forth. In one example, the steps, functions, or operations of method 200 may be performed by a computing device or system 400, and/or processor 402 as described in connection with FIG. 4 below. For instance, the computing device or system 400 may represent any one or more components of a device, server, and/or application server in FIG. 1 that is/are configured to perform the steps, functions and/or operations of the method 200. Similarly, in one example, the steps, functions, or operations of method 200 may be performed by a processing system comprising one or more computing devices collectively configured to perform various steps, functions, and/or operations of the method 200. For instance, multiple instances of the computing device or processing system 400 may collectively function as a processing system. For illustrative purposes, the method 200 is described in greater detail below in connection with an example performed by a processing system. The method 200 begins in step 205 and proceeds to step 210.

At step 210, the processing system identifies a network zone with excess capacity, the network zone comprising a plurality of network components of a telecommunication network.

At optional step 215, the processing system may identify an anticipated network demand from an organization providing a multi-participant extended reality experience (e.g., an XR host system/provider, an XR event host/provider, etc.). For instance, an XR host system, e.g., a VR host system may provide a platform that enables various users to participate in a virtual environment. To illustrate, a VR host system may store data describing a geography and bounds of a virtual space, the terrain of the virtual space, any buildings or other fixtures of the virtual space, moveable virtual objects that may be present in the virtual space and that may be interacted with by users within the virtual space, rules for movement and interaction within the virtual space, information regarding user representations (e.g., avatars), any items/objects possessed by the user representation, specific capabilities of the user representation, and so forth. In addition, a VR host system may provide respective data feeds pertaining to a region of a virtual environment experienced by the respective users (e.g., the region(s) of the virtual environment in which the user representations/avatars are present). In one example, a VR host system may also comprise a VR event provider. However, in another example, a VR event provider may be a different entity that is permitted and enabled to host events within a virtual environment (but which is not the host of the virtual environment itself). For example, a VR event provider may own or lease "digital land" within the virtual environment, and may have a virtual concert venue via which the VR event provider may host an event (e.g., a concert) and invite participants.

In one example, the anticipated network demand may be expressed as a number of anticipated users/participants, the per-user anticipated bandwidth utilization, or both. In one example, the number of users may be identified from a number of users individually responding to invitations from the organization providing the multi-participant extended reality experience. In one example, the per-user anticipated bandwidth utilization may vary from user to user, e.g., depending on device type, connection preferences, tier of participant (e.g., UHD subscriber vs. SD subscriber, etc.). In one example, the organization providing the multi-participant extended reality experience may submit a request to the processing system for permission to utilize excess capacity of one or more network zones for supporting users in accessing an XR event.

At step 220, the processing system transmits an invitation to a set of entities to utilize the network zone to obtain network services at a geographic location of the network zone (e.g., within a boundary of a defined area associated with a wireless access point, within the bounds of an area within communication range of the wireless access point, etc.). For instance, in one example, the set of entities may comprise devices of potential participants in a multi-participant extended reality experience. The invitation may be sent to each entity of the set of entities individually (e.g., via email, text message, application-specific messages, etc. to user devices, such as XR headsets, mobile smartphones, etc.), or may be sent to a device or system associated with the set of entities, such as the organization providing the multi-participant extended reality experience. In one example, the organization providing the multi-participant extended reality experience may have subscribed to receive invitations to utilize excess capacity of network zones of the telecommunication network. In one example, step 220 may include determining that the excess capacity of the network zone meets or exceeds the anticipated network demand obtained at optional step 215. For instance, the processing system may transmit the invitation when it is determined that this condition is satisfied. Otherwise, the processing system may continue to monitor the telecommunication network and seek to identify other network zones (or a different time at the same network zone) that can meet the anticipated demand for the XR event for the organization providing the multi-participant extended reality experience. In addition, the processing system may offer the excess capacity to a different interested entity having a lesser anticipated demand for a desired event.

At optional step 225, the processing system may obtain an acceptance of the invitation from the at least one entity. In one example, the acceptance may be from the organization providing the multi-participant extended reality experience or may be directly from individual entities that may have been provided with invitations by the processing system on behalf of the organization providing the multi-participant extended reality experience.

At optional step 230, the processing system may transmit a token e.g., a passcode, password, or the like to the at least one entity (e.g., at least one device of at least one of the potential participants in the multi-participant extended reality experience). In one example, different tokens may be provided to different entities of the set of entities. In one example, the token(s) may be transmitted to the entities individually, or may be transmitted to the organization providing the multi-participant extended reality experience for dissemination to the at least one entity (e.g., to all entities/participants).

At step 235, the processing system configures at least one network component of the plurality of network components of the network zone in accordance with an anticipated network demand from the set of entities. For instance, the at least one network component may comprise a wireless access point, e.g., a cellular base station. In such an example, step 235 may comprise altering a beam pattern of the at least one wireless access point (such as beam steering a main beam toward a parking lot and/or Individual beam steering (e.g., per UE beamforming)). For example, the wireless access point may be deployed at a mass sporting event venue or a mass entertainment event venue that is not currently being used for a live event (and which may be the cause or major factor in the network zone having excess capacity). As such, the wireless access point may be reconfigured to better serve devices in a parking lot or other area outside the main venue for the XR event.

Alternatively, or in addition, the at least one network component may comprise an edge host of the telecommunication network associated with the network zone (e.g., a host server for hosting virtual machines, containers, or the like that is deployed in a wireless access network portion of the telecommunication network), wherein the configuring comprises instantiating at least one server as a virtual machine deployed on the edge host or providing additional computing resources to at least one server comprising a virtual machine deployed on the edge host, wherein the at least one server is for performing functions for providing at least a portion of the multi-participant extended reality experience.

At optional step 240, the processing system may track a movement of at least a first entity. In one example, optional step 240 may include tracking the movement of a plurality of entities, e.g., the set of entities. For instance, the processing system may better anticipate the actual demand on the network zone in preparation for the entities (e.g., the devices of the potential participants and/or of those already participating) that will be arriving. In other words, some of the entities may not actually come to the network zone despite accepting an invitation to participate in an XR event and to utilize the network zone at a designated time for such XR event.

At optional step 245, the processing system may obtain the token from the at least one entity via at least one of the plurality of components of the network zone. For instance, participating entities (e.g., devices of participants in the XR event) may present the at least one token, e.g., via a wireless access point of the network zone in response to which the processing system may grant access to obtain one or more network services for the XR event and/or in response to which entities presenting the token (or respective tokens) may obtain an enhanced service level for the one or more network services in support of the XR event. For instance, the at least one network service may be provided at a service level, from among a plurality of service levels, that is associated with the token.

At step 250, the processing system provides at least one network service to the at least one entity of the set of entities via the network zone when the at least on entity is physically present at the geographic location of the network zone (e.g., when the at least one entity is physically present within a defined bounds of the network zone and/or within communication range of a wireless access point of the network zone). In one example, the providing of the at least one network service is performed in response to the obtaining of the token from the entity at optional step 245. In one example, the at least one network service comprises a transmission of packets for the multi-participant extended reality experience (e.g., an "XR event"). In one example, step 250 may comprise, for at least a first entity (e.g., at least a first device of at least a first participant from the set of potential participants): providing the at least one network service to the first device at a first service level when the first device is in transit to a physical location of the network zone, and providing the at least one network service to the first device at a second service level when the first device is present at the physical location of the network zone. For instance, the different service levels in transit and at the network zone may be determined based on the tracking performed at optional step 240. The first service level may be a lesser service level as compared to the second service level (e.g., where a lesser service level can be lower priority, e.g., different priority queues through routers, base station(s), other components, etc., reduced bandwidth, limitations on bearers, and so forth). In one example, other devices that are not participating in the XR event may still obtain network services, but these other devices may also be assigned the first priority level or other priority level(s) that are lesser than the second service level for the XR event.

At optional step 255, the processing system may track a utilization of the at least one network service by at least the first entity. For example, the processing system may monitor for bursty traffic, excessive utilization, or other violations. For instance, the system may monitor traffic characteristics for endpoint devices obtaining network services via the network zone for consistency with the particular purpose for which the endpoint devices are invited to utilize the excess capacity of the network zone.

At optional step 260, the processing system may identify that the at least one entity (e.g., the first device) is utilizing the at least one network service for other than the multi-participant extended reality experience. For example, the processing system may detect traffic that appears to be bulk downloading of ultra-high definition (UHD) videos. In this case, the method 200 may proceed to optional step 265. Otherwise, when the processing system detects that the traffic appears to be compliant for the XR event, the method 200 may continue back to optional step 255 for the duration of the XR event or may proceed to optional step 270.

At optional step 265, the processing system may perform at least one of: blocking packets for the at least one entity (e.g., the first device) via the network zone or transmitting the packets in accordance with a first service level that is a lesser service level than a second service level, wherein the second service level is assigned for the multi-participant extended reality experience via the network zone. For instance, the system may block packets for the first device (and any other device) that appear to be offending, may assign a lower quality of service (QoS) and/or quality class indicator (QCI), or otherwise restrict traffic to such devices, such as by placing bandwidth limits, placing traffic to or from these devices in lower priority queues, and so forth. In one example, these restrictions may not be just for offending traffic, but may be applied to all traffic for such endpoint devices. As noted above, the lesser service level may include a service level in which packets are processed with a lower priority, e.g., different priority queues through routers, base station(s), other components, etc., reduced bandwidth, limitations on bearers, and so forth.

At optional step 270, the processing system may detect a utilization of the network zone in excess of a threshold during the multi-participant extended reality experience. For instance, based on the monitoring of optional step 255 the processing system may determine at the beginning of the event that the network utilization over all participants already exceeds a portion of the excess capacity that has been designated for use in connection with the event. Alternatively, or in addition, there may be other entities, e.g., other endpoint devices, that are not participating in the XR event, but that may be obtaining network services from the network zone which may cause the excess capacity to be less than predicted for the time of the XR event. In either case, the method 200 may proceed to optional step 275. Otherwise, when the processing system detects that the traffic appears to be compliant for the XR event, the method may continue back to optional step 255 for the duration of the XR event. In another example, the processing system may detect the lack of utilization of resources at optional step 270. For example, the requested and accepted token from step 230 may be allocated a set of network resources, but those resources may remain unused or may be underutilized relative to the requested levels in step 235. In one example, the processing system may similarly use throttling, blocking, or modification of services as described in step 265. In another example, the method 200 may return to step 235 in which the processing system may reconfigure the network component for the newly detected demand levels as opposed to the originally requested levels (not illustrated).

At optional step 275, the processing system may direct a plurality of the entities (e.g., a plurality of the devices of the potential participants) to an alternate network zone of the telecommunication network for obtaining the at least one network service via the alternate network zone for the multi-participant extended reality experience. For instance, the plurality of device can be those of latecomers, those of the participants having "space-available" reservations, those of participants having addresses closer to the alternate location (e.g., autonomous vehicles can move one or more participants to the alternate location during the multi-participant extended reality experience), those of participants indicating a willingness to move to alternate location, etc. The alternate network zone may be another network zone that has been determined to have spare/excess capacity at the same time as the event. In one example, the alternate network zone may have a lesser overall capacity as the (first) network zone. For instance, the first network zone may include infrastructure to serve a large stadium, while the alternate network zone may include infrastructure to serve a smaller concert hall.

Following step 250 or any one of optional steps 255-275, the method 200 proceeds to step 295 where the method ends.

It should be noted that the method 200 may be expanded to include additional steps, or may be modified to replace steps with different steps, to combine steps, to omit steps, to perform steps in a different order, and so forth. For instance, in one example, optional step 215 may precede step 210. In another example, optional step 215 may follow step 220 or optional step 225. In one example, step 250 may be omitted or may comprise an optional step. In one example the processing system may repeat one or more steps of the method 200, such as step 255, steps 255-270, and so forth. In one example, the method 200 may be expanded or modified to include steps, functions, and/or operations, or other features described in connection with the example(s) of FIGS. 1 and 3, or as described elsewhere herein. Thus, these and other modifications are all contemplated within the scope of the present disclosure.

Figure 3:
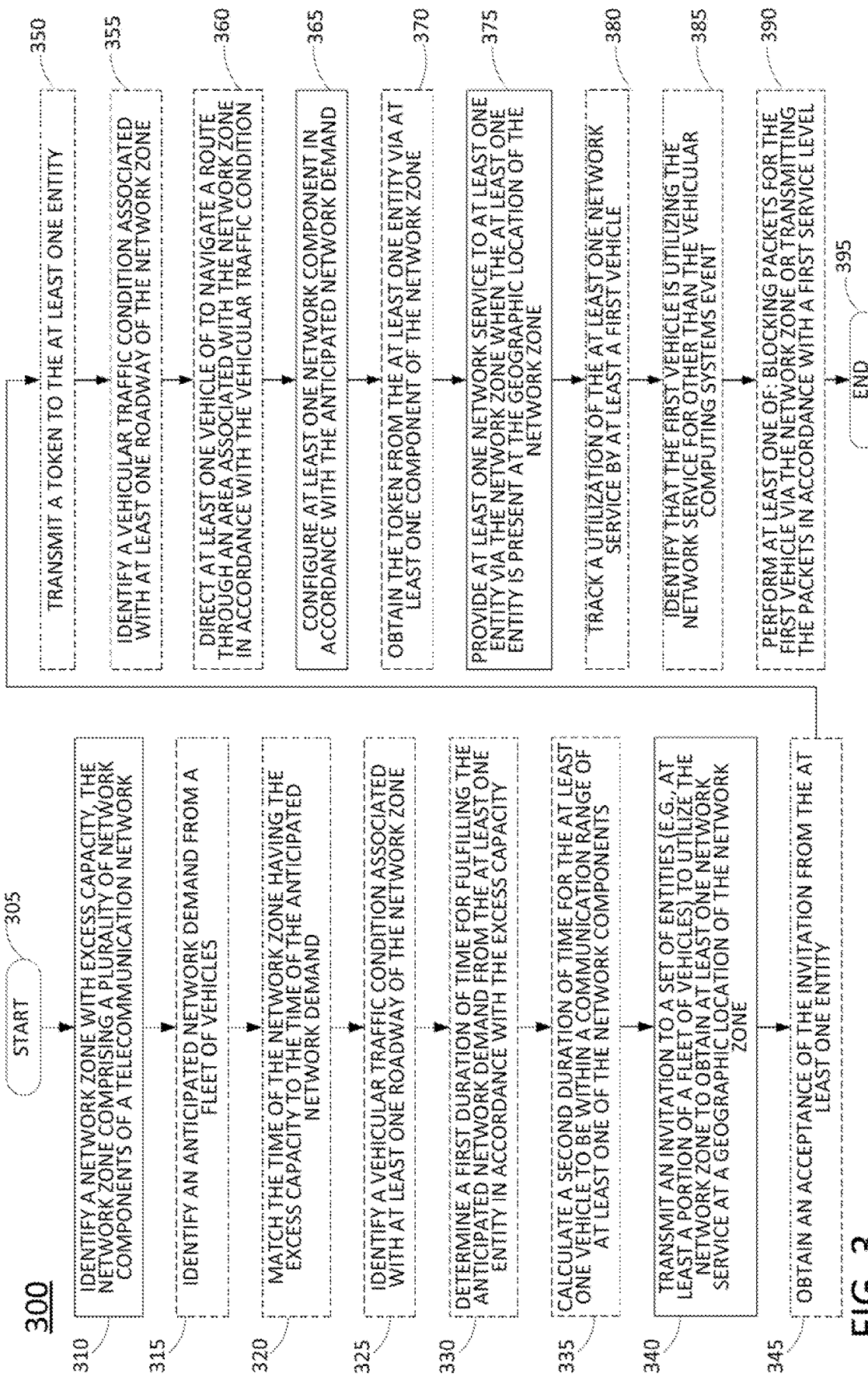
FIG. 3 illustrates a flowchart of an additional example method for providing a network service via a network zone of a telecommunication network with excess capacity to at least one entity of a set of entities present at a geographic location of the network zone and to which an invitation to utilize the network zone is transmitted (e.g., a method for providing a network service via a network zone of a telecommunication network with excess capacity to a fleet of vehicles to which an invitation to utilize the network zone is transmitted)

FIG. 3 illustrates a flowchart of an example method 300 for providing a network service via a network zone of a telecommunication network with excess capacity to devices of potential participants in a vehicular computing systems event to which an invitation to utilize the network zone is transmitted, in accordance with the present disclosure. In one example, the method 300 is performed by a component of the system 100 of FIG. 1, such as by server(s) 104, and/or any one or more components thereof (e.g., a processor, or processors, performing operations stored in and loaded from a memory), by server(s) 104 in conjunction with one or more other devices, such as DB 106, server(s) 116, DB(s) 118, device 114, and so forth. In one example, the steps, functions, or operations of method 300 may be performed by a computing device or system 400, and/or processor 402 as described in connection with FIG. 4 below. For instance, the computing device or system 400 may represent any one or more components of a device, server, and/or application server in FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and proceeds to step 310.

At step 310, the processing system identifies a network zone with excess capacity, the network zone comprising a plurality of network components of a telecommunication network. In one example, step 310 may include identifying a date and a time of the network zone having the excess capacity.

At optional step 315, the processing system may identify an anticipated network demand from a fleet of vehicles. For instance, the anticipated network demand may include an upload of sensor data, usage and operation data, transaction data, other diagnostic data, and so forth. In one embodiment, the anticipated network demand may include non-vehicle equipment carried on the fleet of vehicles, e.g., non-vehicle equipment carried on the fleet of vehicles (e.g., medical equipment in an ambulance, communication equipment in a mobile cellular base station vehicle, power system equipment on a power utility company truck, etc.) may have network demands whereas the vehicle itself (e.g., various vehicle systems such as vehicular suspension system, vehicular battery charging system, vehicular engine management system, etc.) may or may not have any anticipated network demands. The anticipated network demand may alternatively or additionally include a download of a software or firmware update, etc. In one example, optional step 315 may include identifying a time of the anticipated network demand. In one example, optional step 315 may include identifying an area or location of the anticipated network demand (e.g., the fleet of vehicles being associated with an area, such as vehicles from one or more dispatch centers, vehicles of owners in a town, county, state, etc., and so forth). For instance, in one example, a fleet manager may indicate a number of vehicles and that it intends to deploy a 50 GB update to each vehicle. The processing system may then identify at least a portion of the fleet of vehicles that may benefit from the excess capacity in the network zone. The network may similarly identify other network zones that may have excess capacity that may serve other vehicles of the fleet of vehicles to obtain the update (e.g., in other regions that are more geographically suitable for the other vehicles). In one example, the anticipated network demand may be for a mass communications for vehicular computing systems event (e.g., for uploading/offloading data from a fleet of vehicles and/or for downloading data, such as firmware or software updates, to the fleet of vehicles).

At optional step 320, the processing system may match the time of the network zone having the excess capacity to the time of the anticipated network demand (e.g., a time or times that a fleet manager has indicated a desire or willingness to have a mass communications for vehicular computing systems event). In one example, optional step 320 may also include matching the location of the anticipated network demand to the geographic location of the network zone.

At optional step 325, the processing system may identify a vehicular traffic condition associated with at least one roadway of the network zone. For instance, the processing system may receive one or more traffic data feeds from one or more traffic data sources (e.g., a Really Simple Syndication (RSS) traffic data feed). Alternatively, or in addition, the processing system may include or may have access to one or more traffic cameras from which a traffic condition may be determined. In another example, traffic conditions may be detected and recognized directly from one vehicle or the aggregate of vehicles. In one example, an initial traffic condition (e.g. an obstacle or stopped vehicle) may be detected by cameras, LiDAR, or sonar attached to a single vehicle. Additional information such as the size and speed of the general traffic may be additionally provided by information from other sensors or other vehicles within the fleet.

At optional step 330, the processing system may determine a first duration of time for fulfilling the anticipated network demand from the at least one entity in accordance with the excess capacity. For instance, the processing system may determine a maximum per-vehicle uplink or downlink bandwidth that may be provided during the time of the anticipated excess capacity. For instance, the excess capacity in terms of total uplink and/or downlink bandwidth may be divided by the number of anticipated vehicles to determine a per vehicle uplink or downlink bandwidth. The processing system may then determine the first duration of time by dividing the per-vehicle anticipated network demand by the per-vehicle anticipated available bandwidth to determine the minimum time that may be needed. In one example, the per-vehicle uplink or downlink bandwidth may vary based upon a number of vehicles that may be anticipated to simultaneously seek network services from the network zone. For instance, if there are 1000 vehicles that are anticipated to be receiving a software update, but the fleet manager may stagger the vehicles obtaining the software update from the network zone at different times, a maximum of 100 vehicles at any one time may be present and seek network services from the zone. Thus, the processing system may account for this in determining the available bandwidth and hence the anticipated duration of time. It should be noted that in one example, the maximum upload and/or download data rate may nevertheless be limited by the capacity of vehicles' equipment and not the available bandwidth.

At optional step 335, the processing system may calculate a second duration of time for the at least one vehicle to be within a communication range of at least one of the plurality of network components of the network zone. For instance, the at least one vehicle may have a planned route through the network zone. In one example, the processing system may be provided with the intended route and may identify various traffic patterns and how long a vehicle will likely be in the network zone.

At step 340, the processing system transmits an invitation to a set of entities (e.g., at least a portion of a fleet of vehicles) to utilize the network zone to obtain network services at a geographic location of the network zone (e.g., within a boundary of a defined area associated with a wireless access point, within the bounds of an area within communication range of the wireless access point, etc.). For instance, the at least the portion of the fleet of vehicles may comprise vehicles of the fleet that are determined to be located within a vicinity of the network zone (e.g., within a certain distance (direct, or over-road) or a certain amount of time to reach the network zone). As noted above, the vehicles may include self-operating/autonomous vehicles, and/or self-operating capable vehicles (that may or may not be in self-operating mode at relevant time(s)). In one example, the fleet of vehicles may comprise vehicles of at least one of: a particular manufacturer or a particular vehicle model. In one example, the fleet of vehicles may comprise vehicles that are managed by a same organization. In one example, the invitation to the set of entities is transmitted by the processing system to the organization, e.g., where the organization has subscribed to receive invitations to utilize excess capacity of network zones of the telecommunication network.

In one example, the fleet of vehicles may comprise vehicles executing the same network-enabled software or that have observed the same or similar event. For instance, a self-driving algorithm may be used in multiple vehicles. In addition, the algorithm engineers may identify a scenario for additional learning and improvement for the algorithm, such as a deer entering a roadway, an odd intersection, and so forth. In this case, a request may be put out the fleet (e.g., any vehicle using this algorithm and/or any vehicle that has encountered a similar event). For example, it may also be desirable to gather data on how other self-driving algorithms act, and how the algorithms interact or cause respective vehicles to interact with each other when encounter an odd scenario that involves two or more vehicles. In other words, in one example, a fleet may not necessarily involve vehicles of a same type or manufacture. In this scenario, vehicles may be requested to store the data, and then directed or requested to visit the network zone in order to contribute the large sets of data back across the network.

In one example, the invitation may be transmitted when the time of the network zone having the excess capacity is matched to the time of the anticipated network demand (e.g., in response to such a determination). In one example, the invitation is sent for at least one vehicle of the fleet of vehicles (e.g., at least one of the entities) when the first duration of time from optional step 330 is less than the second duration of time from optional step 335. In other words, the processing system may identify traffic patterns and how long a vehicle will be in the network zone to obtain the service, to make sure there is enough time to complete an anticipated data usage for the event.

At optional step 345, the processing system may obtain an acceptance of the invitation from the at least one entity. In one example, the acceptance may be from the organization providing the mass communications for vehicular computing systems event or may be from individual entities that may have been provided with invitations by the processing system on behalf of the organization.

At optional step 350, the processing system may transmit a token to the at least one entity, e.g., a passcode, password, or the like. In one example, different tokens may be provided to different entities of the set of entities. In one example, the token(s) may be transmitted to the entities individually, or may be transmitted to the organization providing the mass communications for vehicular computing systems event for dissemination to the at least one entity (e.g., to all vehicles of the at least the portion of the fleet of vehicles).

At optional step 355, the processing system may identify a vehicular traffic condition associated with at least one roadway of the network zone (e.g., a roadway that traverses through or is proximate to the network zone). For instance, the processing system may receive one or more traffic data feeds from one or more traffic data sources (e.g., a Really Simple Syndication (RSS) traffic data feed). Alternatively, or in addition, the processing system may include or may have access to one or more traffic cameras from which a vehicular traffic condition may be determined. In one example, optional step 355 may comprise the same or similar operations as optional step 325 above.

At optional step 360, the processing system may direct at least one vehicle of the fleet of vehicles to navigate a route through an area associated with the network zone in accordance with the vehicular traffic condition. For instance, optional step 360 may include selecting the route with an anticipated traffic delay in accordance with the vehicular traffic condition to meet an anticipated network demand from the at least one vehicle, or to maintain a presence of the at least one vehicle within a communication range of at least one of the plurality of network components of the network zone for a target duration of time. For instance, the processing system may direct one or more vehicles into traffic so as to meet an entire data transmission requirement for a vehicle, or to keep a vehicle in range for maximum allowable duration of time. For example, a fleet operator may set a maximum delay of 15 minutes, which may not be enough to meet an entire demand, but may allow a vehicle to complete a large percentage of a desired upload and/or download. In another example, the route may include parking in a parking space for a duration of time. In one example, the selecting of the route may include reserving the parking space, and the directing may comprise directing the at least one vehicle to park in the parking space for the duration of time. With no loss of generality, the parking space may also include capacity measurement and understanding in different vehicle configurations (e.g., flying, submersible, underground) and with cargo or internal occupancy considerations (e.g., temperature or time sensitive contents, human, animal or living passengers, or sub-systems such as drones or sensors that may similarly act as network-connected peers instead of as passive cargo alone).

At step 365, the processing system configures at least one network component of the plurality of network components in accordance with an anticipated network demand from the set of entities. For instance, the at least one network component may comprise a wireless access point, e.g., a cellular base station. In such an example, step 365 may comprise altering a beam pattern of the at least one wireless access point (such as beam steering a main beam toward a roadway or a parking lot, and/or individual beam steering (e.g., per UE beamforming)). For example, the wireless access point may be deployed at a mass sporting event venue or a mass entertainment event venue that is not currently being used for a live event (and which may be the cause or major factor in the network zone having excess capacity). As such, the wireless access point may be reconfigured to better serve network-connected vehicles passing along one or more nearby roadways, or other proximate areas outside the main venue.

Alternatively, or in addition, the at least one network component may comprise an edge host of the telecommunication network associated with the network zone (e.g., a host server for hosting virtual machines, containers, or the like that is deployed in a wireless access network portion of the telecommunication network), wherein the configuring comprises instantiating at least one server as a virtual machine deployed on the edge host or providing additional computing resources to at least one server comprising a virtual machine deployed on the edge host, and wherein the at least one server is for performing functions for providing firmware updates, software updates, or the like to vehicles of the fleet that connect to a wireless access point of the network zone.

At optional step 370, the processing system may obtain the token from the at least one entity via at least one of the plurality of components of the network zone. For instance, the vehicles may present the at least one token, e.g., via a wireless access point of the network zone in response to which the processing system may grant access to obtain one or more network services for the mass communications for vehicular computing systems event and/or in response to which vehicles presenting the token (or respective tokens) may obtain an enhanced service level for the one or more network services in support of the event. For instance, the at least one network service may be provided at a service level, from among a plurality of service levels, that is associated with the token(s).

At step 375, the processing system provides at least one network service to the at least one entity of the set of entities via the network zone when the at least one entity is physically present at the geographic location of the network zone (e.g., when the at least one entity is physically present within a defined bounds of the network zone and/or within communication range of a wireless access point of the network zone). In one example, the providing of the at least one network service to the at least one entity is performed in response to the obtaining of the token at optional step 370. In one example, the at least one network service is provided at a service level, from among a plurality of service levels, that is associated with the token. For instance the token (or plurality of different tokens) may be provided to the vehicles, where the token(s), when presented in network zone, cause the vehicle(s) to be provided with a particular quality of service (QoS), quality class indicator (QCI), or the like. In one example, the processing system may store and disseminate a firmware update, a software update, or the like. For instance, the update may be stored at an edge host of the telecommunication network for provisioning to vehicles in the network zone.

At optional step 380, the processing system may track a utilization of the at least one network service by at least a first vehicle. For example, the processing system may monitor for bursty traffic, excessive utilization, or other usage violations. For instance, the system may monitor (data) traffic characteristics for vehicles obtaining network services via the network zone for consistency with the particular purpose for which the vehicles are invited to utilize the excess capacity of the network zone.

At optional step 385, the processing system may identify that the at least the first vehicle is utilizing the at least one network service for other than the mass communications for vehicular computing systems event. For example, the processing system may detect (data) traffic that appears to be bulk downloading of ultra-high definition (UHD) videos. In this case, the method 300 may proceed to optional step 390. Otherwise, when the processing system detects that the traffic appears to be compliant for the mass communications for vehicular computing systems event, the method may continue back to optional step 380 for the duration of the event, following which the method 300 may proceed to step 395.

At optional step 390, the processing system may perform at least one of: blocking packets for the at least the first vehicle via the network zone or transmitting the packets in accordance with a first service level that is a lesser service level than a second service level, wherein the second service level is assigned for the mass communications for vehicular computing systems event via the network zone. For instance, the system may block packets for the first vehicle (and any other vehicles, or other devices) that appear to be offending, may assign a lower quality of service (QoS) and/or quality class indicator (QCI), or otherwise restrict traffic to such vehicle(s), such as by placing bandwidth limits, placing traffic to or from these vehicle(s) in lower priority queues, and so forth. In one example, these restrictions may not be just for offending traffic, but may be applied to all traffic for such vehicle(s). As noted above, the lesser service level may include a service level in which packets are processed with a lower priority, e.g., different priority queues through routers, base station(s), other components, etc., reduced bandwidth, limitations on bearers, and so forth.

Following step 375 or any one of the optional steps 380-390, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example, optional step 315 may precede step 310. In another example, optional step 315 may follow step 340. In one example, step 375 may be omitted or may comprise an optional step. In one example the processing system may repeat one or more steps of the method 300, such as optional step 380 for the duration of the event. In one example, the method 300 may further include identifying endpoint devices attempting to connect via the network zone that are not authorized for the mass communications for vehicular computing systems event and either blocking these endpoint devices, restricting data traffic for such endpoint devices, or providing a default service level to such endpoint devices (e.g., where the vehicles participating in the mass communications for vehicular computing systems event may receive an enhanced/elevated service level. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 200 or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the examples of FIG. 2 or 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for providing a network service via a network zone of a telecommunication network with excess capacity to at least one entity of a set of entities present at a geographic location of the network zone and to which an invitation to utilize the network zone is transmitted, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is/are implemented in a distributed or parallel manner for a particular illustrative example, i.e., the steps of the above method(s) or the entire method(s) is/are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for providing a network service via a network zone of a telecommunication network with excess capacity to at least one entity of a set of entities present at a geographic location of the network zone and to which an invitation to utilize the network zone is transmitted (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for providing a network service via a network zone of a telecommunication network with excess capacity to at least one entity of a set of entities present at a geographic location of the network zone and to which an invitation to utilize the network zone is transmitted (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   identifying, by a processing system including at least one processor, a network zone with excess capacity, the network zone comprising a plurality of network components of a telecommunication network;
   transmitting, by the processing system, an invitation to a set of entities to utilize the network zone to obtain at least one network service at a geographic location of the network zone, wherein the set of entities comprises devices of potential participants in a multi-participant extended reality experience;
   configuring, by the processing system, at least one network component of the plurality of network components in accordance with an anticipated network demand from the set of entities, wherein the anticipated network demand comprises a number of anticipated users and a per-user anticipated bandwidth utilization for the multi-participant extended reality experience; and
   providing, by the processing system, the at least one network service to at least one entity of the set of entities via the network zone when the at least one entity is present at the geographic location of the network zone.

2. The method of claim 1, wherein the set of entities further comprises at least a portion of a fleet of vehicles.

3. The method of claim 2, wherein the fleet of vehicles comprises:
   vehicles of at least one of: a particular manufacturer or a particular vehicle model; or
   vehicles that are managed by a same organization.

4. The method of claim 2, further comprising:
   identifying at least a portion of the anticipated network demand from the at least the portion of the fleet of vehicles.

5. The method of claim 4, further comprising: for at least one vehicle of the fleet of vehicles:
   identifying a vehicular traffic condition associated with at least one roadway of the network zone;
   determining a first duration of time for fulfilling the anticipated network demand from the at least one entity in accordance with the excess capacity; and
   calculating a second duration of time for the at least one vehicle to be within a communication range of the at least one network component of the plurality of network components of the network zone.

6. The method of claim 5, wherein the invitation is sent when the first duration of time is less than the second duration of time.

7. The method of claim 2, further comprising:
   identifying a vehicular traffic condition associated with at least one roadway of the network zone; and
   directing at least one vehicle of the fleet of vehicles to navigate a route through an area associated with the network zone in accordance with the vehicular traffic condition.

8. The method of claim 7, wherein the directing comprises:
   selecting the route with an anticipated traffic delay in accordance with the vehicular traffic condition to meet an anticipated network demand from the at least one vehicle or to maintain a presence of the at least one vehicle within a communication range of the at least one network component of the plurality of network components of the network zone for a target duration of time.

9. The method of claim 8, wherein the route includes parking in a parking space for a duration of time, wherein the selecting the route includes reserving the parking space, and wherein the directing the at least one vehicle to navigate the route comprises directing the at least one vehicle to park in the parking space for the duration of time.

10. The method of claim 1, further comprising:
    obtaining an acceptance of the invitation from the at least one entity;
    transmitting a token to the at least one entity; and
    obtaining the token from the at least one entity via at least one of the plurality of components of the network zone, wherein the providing of the at least one network service to the at least one entity is performed in response to the obtaining of the token.

11. The method of claim 10, wherein the at least one network service is provided at a service level that is associated with the token from among a plurality of service levels.

12. The method of claim 1, wherein the at least one network component comprises at least one wireless access point, wherein the at least one wireless access point is deployed at a mass sporting event venue or a mass entertainment event venue.

13. The method of claim 12, wherein the configuring comprises altering a beam pattern of the at least one wireless access point.

14. The method of claim 1, further comprising:
    identifying the anticipated network demand from an organization providing the multi-participant extended reality experience.

15. The method of claim 1, further comprising:
    tracking a movement of the at least one entity.

16. The method of claim 15, wherein the at least one network service comprises a transmission of packets for the multi-participant extended reality experience, wherein the providing of the at least one network service comprises, for at least a first device of the at least one entity:

providing the at least one network service to the first device at a first service level when the first device is in transit to the geographic location of the network zone; and providing the at least one network service to the first device at a second service level when the first device is present at the geographic location of the network zone.

17. A non-transitory computer-readable medium storing instructions which, when executed by a processing system including at least one processor, cause the processing system to perform operations, the operations comprising:

identifying a network zone with excess capacity, the network zone comprising a plurality of network components of a telecommunication network;

transmitting an invitation to a set of entities to utilize the network zone to obtain at least one network service at a geographic location of the network zone, wherein the set of entities comprises devices of potential participants in a multi-participant extended reality experience;

configuring at least one network component of the plurality of network components in accordance with an anticipated network demand from the set of entities, wherein the anticipated network demand comprises a number of anticipated users and a per-user anticipated bandwidth utilization for the multi-participant extended reality experience; and providing the at least one network service to at least one entity of the set of entities via the network zone when the at least one entity is present at the geographic location of the network zone.

18. An apparatus comprising:

a processing system including at least one processor; and a computer-readable medium storing instructions which, when executed by the processing system, cause the processing system to perform operations, the operations comprising:

identifying a network zone with excess capacity, the network zone comprising a plurality of network components of a telecommunication network;

transmitting an invitation to a set of entities to utilize the network zone to obtain at least one network service at a geographic location of the network zone, wherein the set of entities comprises devices of potential participants in a multi-participant extended reality experience;

configuring at least one network component of the plurality of network components in accordance with an anticipated network demand from the set of entities, wherein the anticipated network demand comprises a number of anticipated users and a per-user anticipated bandwidth utilization for the multi-participant extended reality experience; and providing the at least one network service to at least one entity of the set of entities via the network zone when the at least one entity is present at the geographic location of the network zone.

19. The apparatus of claim 18, the operations further comprising:

obtaining an acceptance of the invitation from the at least one entity;

transmitting a token to the at least one entity; and obtaining the token from the at least one entity via at least one of the plurality of components of the network zone, wherein the providing of the at least one network service to the at least one entity is performed in response to the obtaining of the token.

20. The apparatus of claim 19, wherein the at least one network service is provided at a service level that is associated with the token from among a plurality of service levels.

* * * * *